United States Patent
Sato et al.

(10) Patent No.: US 7,807,117 B2
(45) Date of Patent: Oct. 5, 2010

(54) RECYCLE OF ELECTRICAL EQUIPMENT

(75) Inventors: Kohei Sato, Tainai (JP); Tomohiro Kaizu, Seirou (JP)

(73) Assignee: Hitachi Industrial Equipment Systems Co., Ltd., Tokyo (JP)

(*) Notice: Subject to any disclaimer, the term of this patent is extended or adjusted under 35 U.S.C. 154(b) by 42 days.

(21) Appl. No.: 12/389,501

(22) Filed: Feb. 20, 2009

(65) Prior Publication Data

US 2009/0162254 A1    Jun. 25, 2009

Related U.S. Application Data

(63) Continuation of application No. 12/072,583, filed on Feb. 26, 2008.

(30) Foreign Application Priority Data

Jul. 13, 2007    (JP)    ............... 2007-183810

(51) Int. Cl.
    *B01J 8/02*    (2006.01)
(52) U.S. Cl. .................. 422/211; 422/122; 422/129; 422/255; 510/109; 510/188; 528/480; 528/488; 521/40
(58) Field of Classification Search .......... 521/40, 521/40.5, 41, 41.5, 42, 43, 47, 48, 48.5; 528/480, 528/488, 489, 491, 495; 510/188; 422/120, 422/122, 129, 11, 255, 292
See application file for complete search history.

(56) References Cited

U.S. PATENT DOCUMENTS 5,069,992 A    12/1991    Tachikawa et al.
6,245,822 B1*    6/2001    Terada et al. .................. 521/49
6,962,628 B1*    11/2005    Shibata et al. .................. 134/13

FOREIGN PATENT DOCUMENTS

FR    2263995 A    11/1975
JP    04-022477    1/1992
JP    2001-172426    6/2001

OTHER PUBLICATIONS

Derwent abstract of French Patent FR2263995.
Maekawa, et al. "FRP Recycling Technology Involving Depolymerization of Unsaturated Polyester Under Ordinary Pressure," Hitachi Chemical Technical Report No. 42 (2004).

* cited by examiner

*Primary Examiner*—Ling-Siu Choi
*Assistant Examiner*—Frances Tischler
(74) *Attorney, Agent, or Firm*—Townsend and Townsend and Crew LLP (57) ABSTRACT

The present invention addresses a problem with conventional techniques for recycling electrical equipment that have a hardened epoxy resin and electroconductive material where a catalyst is degraded to an extent that it can no longer be reused when water is present in a dissolving system. Moisture, when present in the dissolving system for treating electrical equipment including electroconductive material of aluminum, may react with aluminum to produce an aluminate compound which is transformed into aluminum oxide (alumina) under heating, which, in turn, may cause abnormal temperature rise to melt aluminum. This may be accompanied by formation of hydrogen which can cause danger of explosion. The present invention manages moisture content in a dissolving system by drying an object to be treated with a catalyst and a solvent prior to the dissolving treatment.

1 Claim, 8 Drawing Sheets

RECYCLE OF ELECTRICAL EQUIPMENT

INCORPORATION BY REFERENCE

The present application claims priority from Japanese application JP 2007-183810 filed on Jul. 13, 2007, the content of which is hereby incorporated by reference into this application.

FIELD OF THE INVENTION

The present invention relates to recycle of electrical equipment in which a hardened epoxy resin is contained.

BACKGROUND OF THE INVENTION

Recently, recycling of products in which fiber-reinforced plastics (FRPs) are used have been demanded, and the recycling techniques include crushing and thermal decomposition. Patent Document 1 (JP-A-4-22477) discloses dismantlement of molded coils of epoxy resin, in which the coils are heated, thermally decomposed and hydrolyzed at high temperature with water or aqueous alkaline solution.

Patent Document 2 (JP-A-2001-172426) discloses treatment in which hardened epoxy resins are decomposed and dissolved. Non-patent Document 1 describes recycling of common FRPs.

(Patent Document 1) JP-A-4-22477
(Patent Document 2) JP-A-2001-172426
(Non-patent Document 1) Hitachi Chemical Technical Report No. 42 (2004-1).

BRIEF SUMMARY OF THE INVENTION

In recycling of electrical equipment in which the equipment including a hardened epoxy resin and electroconductive material is treated with a treating solution containing a solvent and at least one species of metallic salt as a catalyst to dissolve the epoxy resin and recover the electroconductive material and fillers contained in the epoxy resin, the catalyst is degraded and difficult to reuse when the dissolution system contains moisture.

Of electrical equipment types which include a hardened epoxy resin and electroconductive material, those containing aluminum conductor as an electroconductive material may cause problems when the dissolution system is contaminated with moisture, because the moisture reacts with aluminum to produce an aluminate compound which is transformed into aluminum oxide (alumina) under heating, which, in turn, may cause abnormal temperature rise to melt aluminum.

This may be accompanied by generated hydrogen, which can cause danger of explosion. It is crucial, therefore, to manage moisture in an overall process involving a material to be treated, catalyst, solvent and dissolution device.

It is an object of the present invention to provide a recycling process which safely and economically dissolves electrical equipment mainly composed of a hardened epoxy resin and an electroconductive material to recover the electroconductive material and a filler contained in an epoxy resin by solving the above problems.

Other objects, features and advantages of the invention will become apparent from the following description of the embodiments of the invention taken in conjunction with the accompanying drawings.

DESCRIPTION OF REFERENCE NUMERALS

1: Core, 10: Primary terminal, 11: Secondary terminal, 12: Clasp,

19: Molded transformer for receiving and distributing high-voltage power, 19a: Used molded transformer for receiving and distributing high-voltage power,

2: Primary coil,

20: Secondary coil, 21: Resin, 22: Winding wire,

23: Insulator in molded coil, 24: Epoxy resin,

24a: Dissolving epoxy resin (for fuel), 25: Silica, 25a: Recovered silica (for recycle),

25z: Filtration cake, 26: Glass fiber and others,

27: Electroconductive material for winding wire,

27a: Recovered electroconductive material for winding wire (for recycle),

28: Insulating material for winding wire,

30a: Molded coil manufacturing process,

30b: Molded transformer manufacturing process,

40: Molded transformer service period (20 to 30 years),

50: Molded transformer dismantling process,

60: X-Y plane, 61: Z-direction, 62: A-A' section, 63: Upper coil portion (Section B),

7: Dissolution processing tank,

7a: Basket for object to be treated (dissolution basket), 7b: Basket for catalyst, 7c: Basket for desiccating agent,

70: Management tank, 71a: Ball valve, 71b: Ball valve, 72: Slurry pump, 73: Nitrogen cylinder, 74: Condenser (Heat Exchanger), 75: Motor for stirrer, 75a: Agitating blade, 76: Distillation unit, 77a: Exhausting hood, 77b: Exhausting hood, 78a: Receiver container, 78b. Receiver container, 79: Control panel,

8: Molded coil dissolution treatment,

8a: Step for charging object to be treated, catalyst, solvent and desiccating agent into dissolution processing tank,

80a: Step for drying molded coil,

80b: Step for putting dried molded coil into dissolution basket,

80c: Step for withdrawing insolubles from dissolution basket after dissolution treatment is over,
80d: Step for washing insolubles withdrawn from dissolution basket,
81a: Step for drying catalyst,
81b: Step for putting dried catalyst into catalyst basket,
81c: Step for withdrawing catalyst from catalyst basket after dissolution treatment is over,
81d: Step for washing and drying catalyst withdrawn from catalyst basket,
82a: Dehydration treatment of solvent,
82b: Measurement of moisture in dehydrated solvent,
82c: Step for withdrawing solvent from dissolution processing tank after dissolution treatment is over,
82d: Step for filtering solvent withdrawn from dissolution processing tank,
82e: Step for distilling filtrate from solvent filtration,
83a: Step for washing and drying desiccating agent used for solvent dehydration treatment,
83b: Step for putting desiccating agent into desiccating agent basket,
83c: Step for withdrawing desiccating agent from desiccating agent basket after dissolution treatment is over,
83d: Step for washing and drying desiccating agent used for dissolution treatment,
84a: Step for withdrawing silica by washing filtration cake obtained separated from solvent by filtration after dissolution treatment is over,
90: Solvent (benzyl alcohol),
90': Dehydrated solvent (benzyl alcohol),
90a: Recycled solvent (benzyl alcohol),
90a': Dehydrated recycled solvent (benzyl alcohol),
90z: Filtrate,
91: Catalyst (tribasic potassium phosphate n-hydrate),
91': Dried catalyst (tribasic potassium potassium phosphate n-hydrate),
91a: Recycled catalyst (tribasic potassium phosphate n-hydrate),
91a': Dried recycled catalyst (tribasic potassium phosphate n-hydrate),
93: Desiccating agent (molecular sieves),
93a: Recycled desiccating agent (molecular sieves),
93z: Used desiccating agent (molecular sieves),
94: Nitrogen gas

DETAILED DESCRIPTION OF THE INVENTION

The present invention provides, for solving the above problems, a process for recycling an electrical equipment, comprising the steps of:
using the electrical equipment, which contains a hardened epoxy resin and an electroconductive material, as an object to be treated;
subjecting the electrical equipment, a catalyst and a solvent to a drying and then to a moisture control; then
treating the electrical equipment with a treating solution containing the solvent and at least one species of a metallic salt as the catalyst, to dissolve the hardened epoxy resin; and thereby recovering the electroconductive material and a filler contained in the epoxy resin.

The present invention provides the above recycling process, wherein the electrical equipment to be treated is a molded coil of a molded transformer for receiving and distributing high-voltage power.

The present invention provides the above recycling process, wherein the dissolution is carried out under a normal pressure.

The present invention provides the above recycling process, wherein the catalyst is an alkali metal salt, preferably tribasic potassium phosphate.

The present invention provides the above recycling process, wherein the solvent is alcohols, preferably benzyl alcohol.

The present invention provides the above recycling process, wherein the electroconductive material is an aluminum conductor.

The present invention provides the above recycling process, wherein the moisture management level of the dried solvent is set at 0.1% or less, the level which causes no problem being 0.5% or less.

The present invention provides the above recycling process, further including the step of using a molecular sieves for dehydration processing of solvent.

The present invention provides the above recycling process, further including the step of using a molecular sieves for a dehydration in the dissolution treatment.

The present invention provides the above recycling process, further including the step of dividing the object to be treated into pieces before the dissolution treatment.

The present invention provides the above recycling process, further including the step of crushing the object to be treated into a plurality of pieces before the dissolution treatment.

The present invention provides a system for recycling an electrical equipment, comprising:
a dissolution processing tank for putting an object to be treated, a catalyst, a solvent and a desiccating agent, wherein a dissolution treating solution is stirred during a dissolution treatment.

EXAMPLES

Examples of the present invention are described by referring to the attached drawings.

Example 1

There are many types of electrical equipment including a hardened epoxy resin and electroconductive material, and the present invention is described taking a molded transformer for receiving and distributing high-voltage power as an example of the electrical equipment.

Figure 1A:
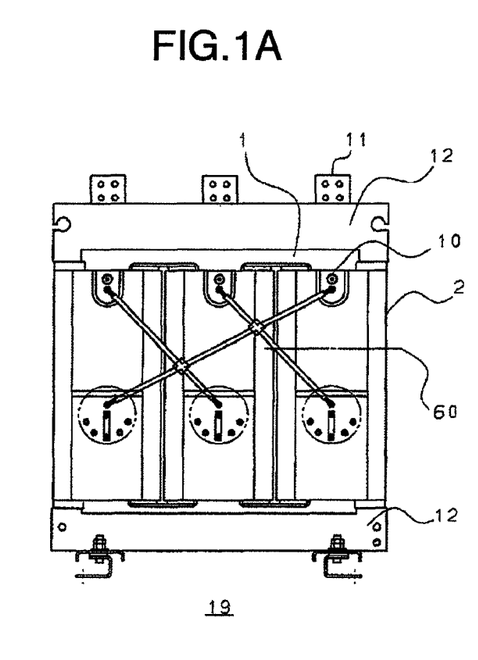
FIG. 1A and FIG. 1B are an external view of molded transformer for receiving and distributing high-voltage power.
Figure 1B:
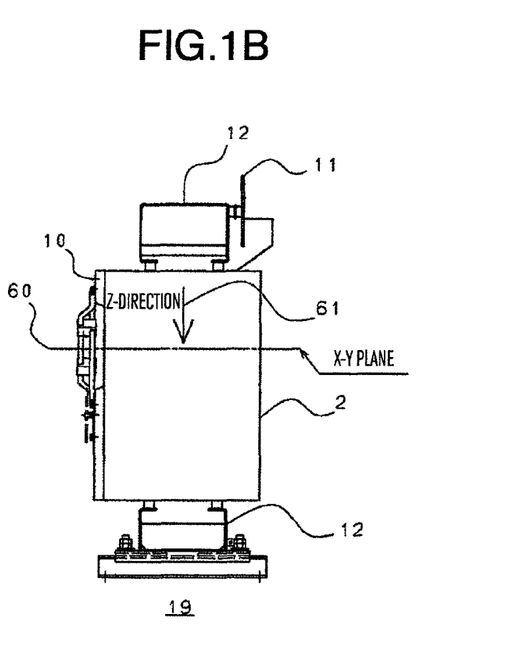
Figure 2A:
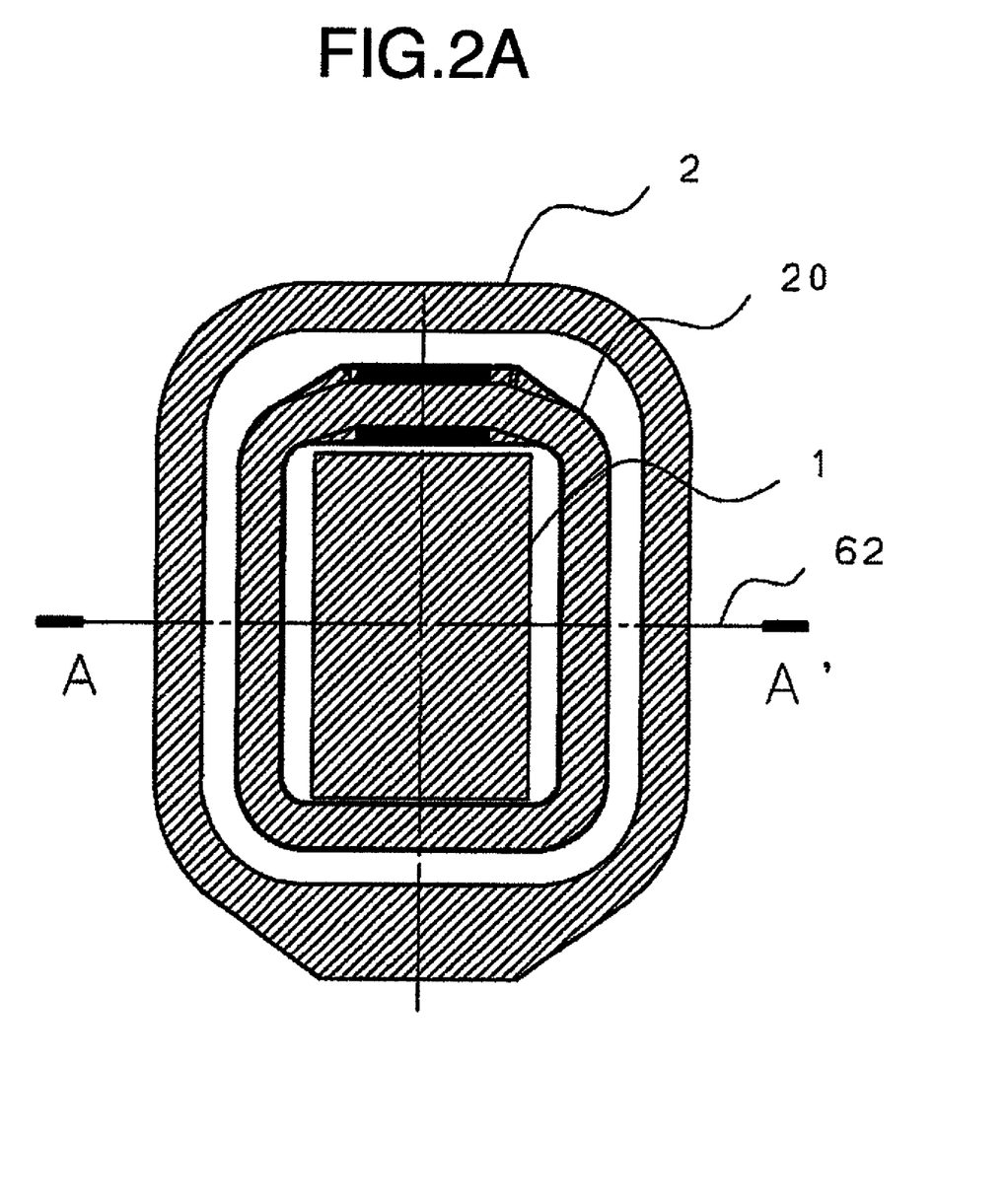
FIG. 2A is a cross-sectional view of the molded transformer for receiving and distributing high-voltage power, illustrated in FIG. 1, cut along the X-Y plane.
Figure 2B:
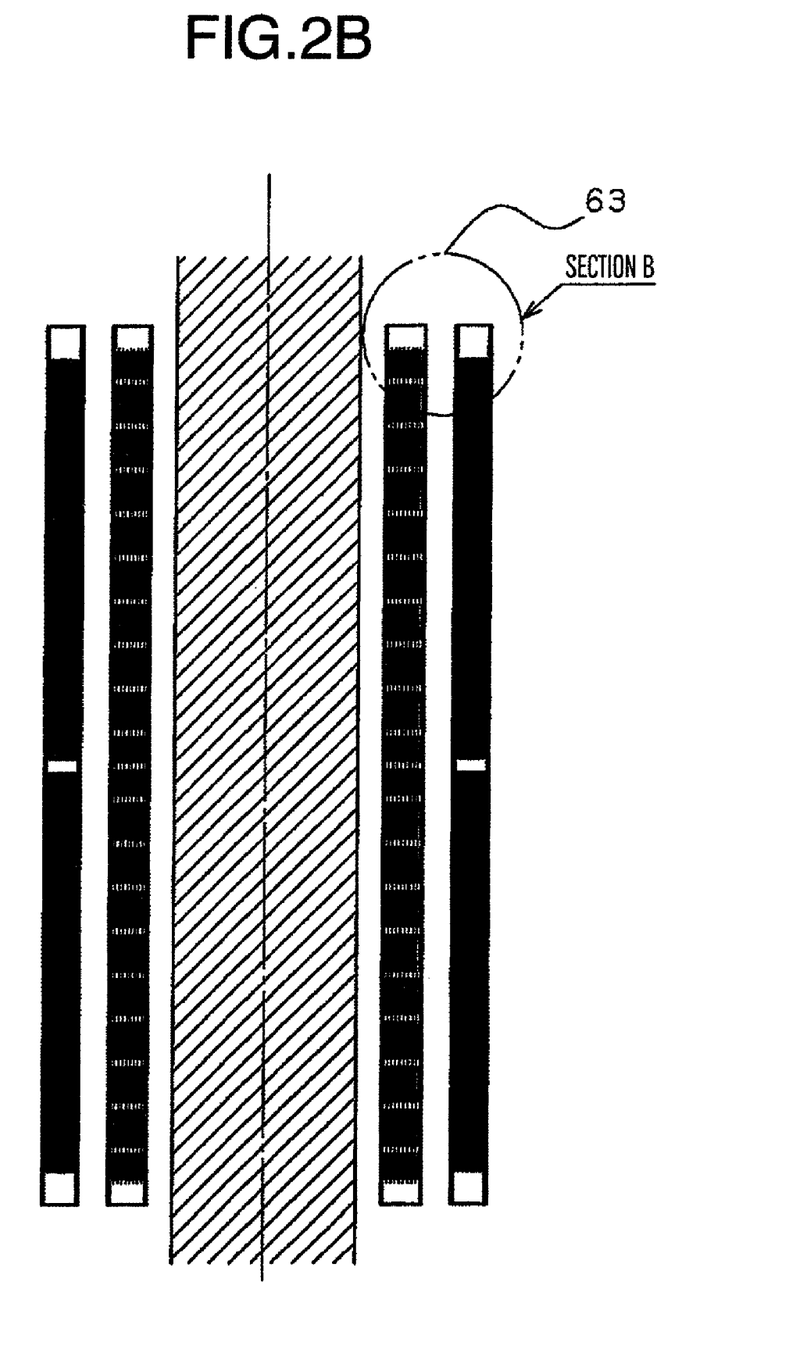
FIG. 2B is a cross-sectional view of the molded coil for the molded transformer for receiving and distributing high-voltage power, illustrated in FIG. 2A, cut along the A-A plane.
Figure 2C:
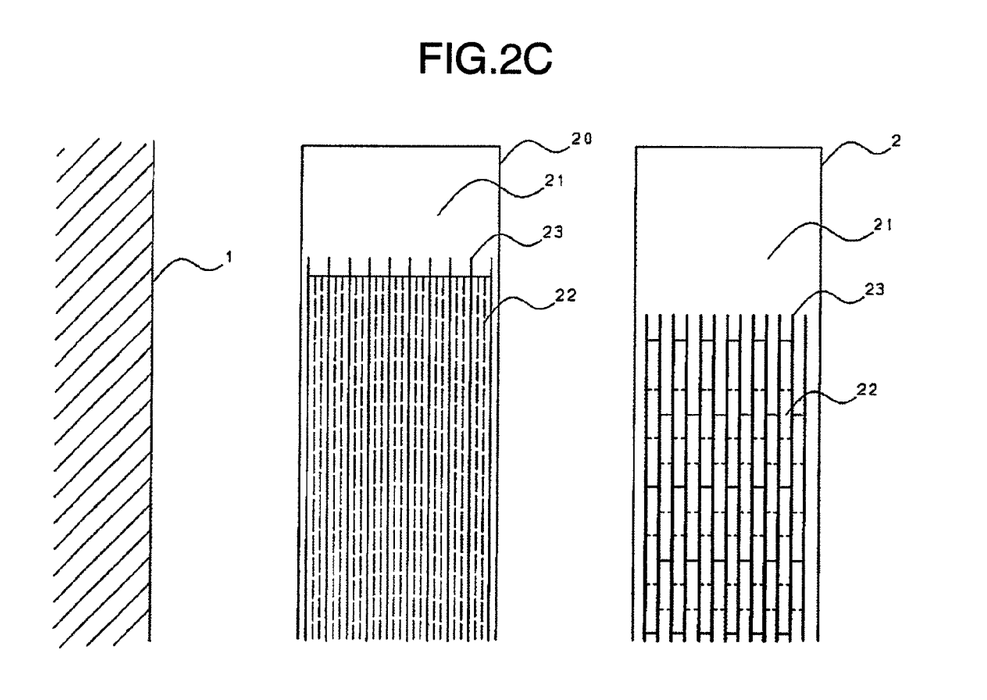
FIG. 2C is the enlarged section B in the molded coil, illustrated in FIG. 2B.

Referring to FIG. 1, a molded transformer 19 for receiving and distributing high-voltage power is mainly composed of a core 1, primary coil 2, secondary coil 20, primary terminal 10, secondary terminal 11, clasp 12 and so forth. Each of the primary coil 2 and secondary coil 20 is composed of a resin 21, winding wire 22, inter-layer insulator 23 and so forth, as illustrated in FIG. 2. The primary and secondary coils, electrically separated from each other, are magnetically connected to each other by the core 1, and the primary and secondary turn ratio will directly represent voltage ratio for voltage conversion. In Japan, a most standard molded transformer receives power of 6600 V at the primary terminal 10 to induce power of 210 V at the secondary terminal 11. Transformer users connect a load to the secondary terminal 11.

Figure 3A:
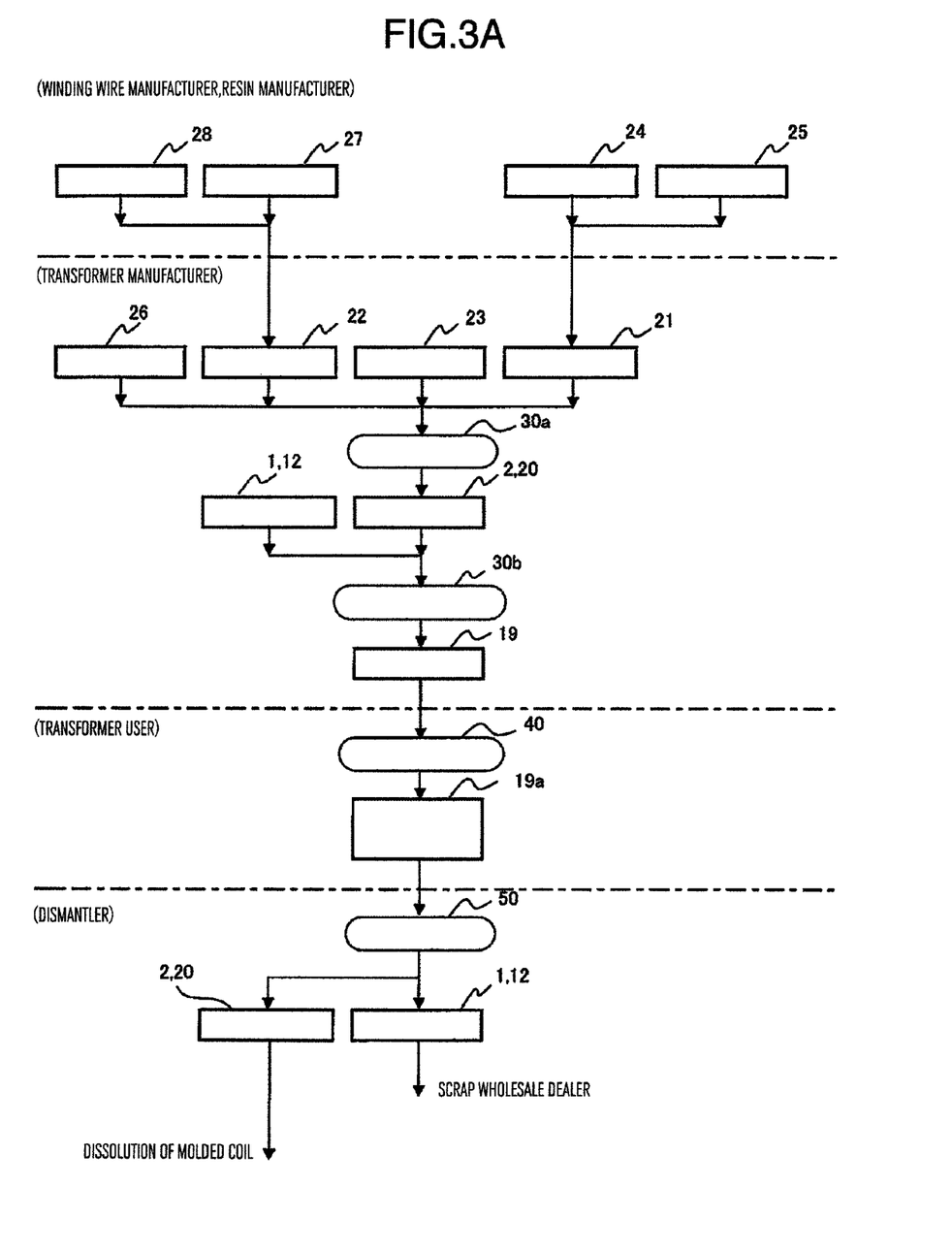
FIG. 3A illustrate a part of overall molded transformer recycling flow scheme for molded transformer fabrication, operation and dismantlement after it is discarded.
Figure 3B:
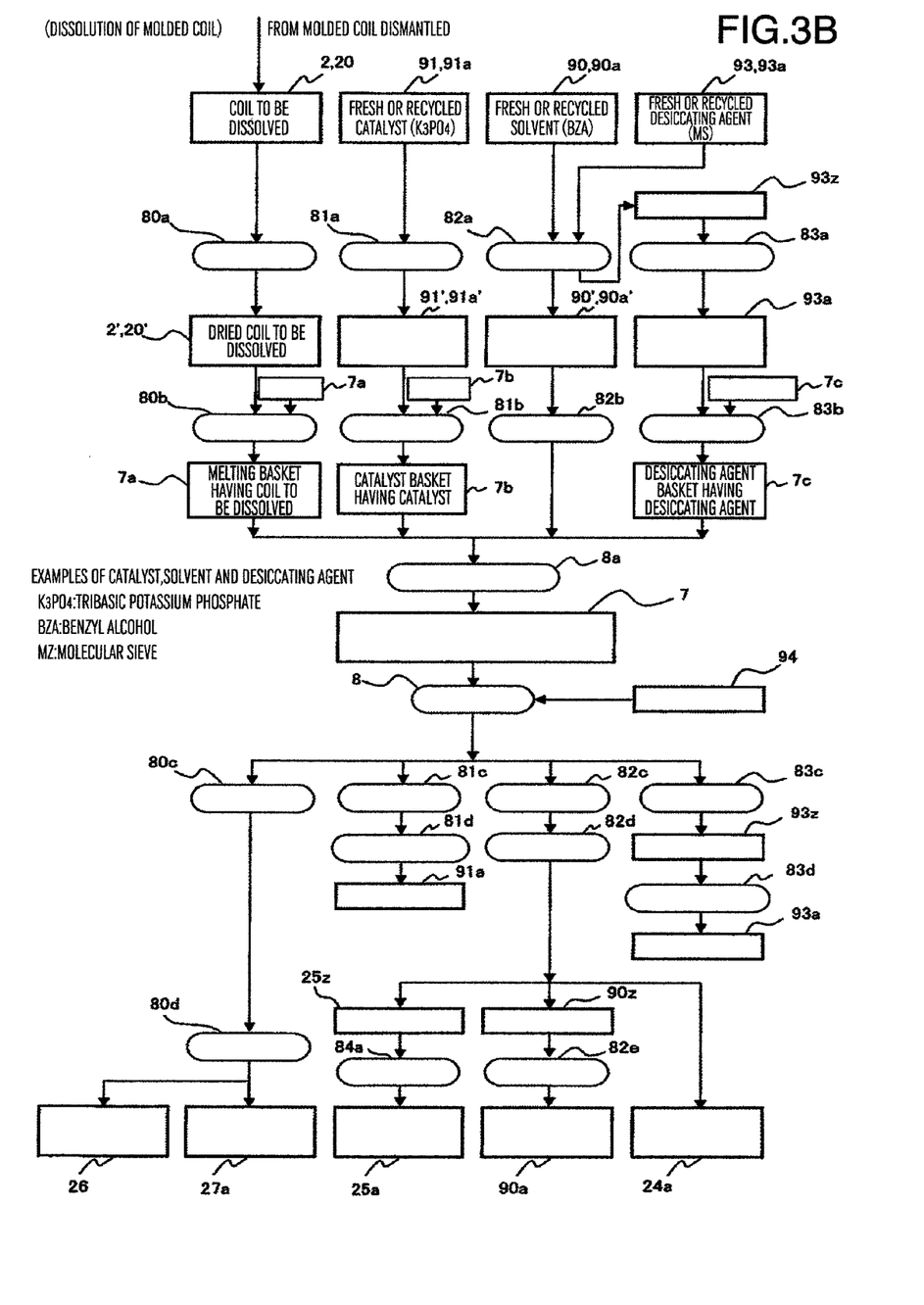
FIG. 3B illustrates a part of overall molded transformer recycling flow scheme for molded coil dissolution and material recovery.

FIG. 3 illustrates a flow scheme for recycling a molded transformer.

The winding wire 22 needed for make a molded coil in the step 30a is supplied from a coil manufacturer who manufactures the wire with an insulating material 28 for the coil and electroconductive material 27. A resin 21 needed for make the molded coil in the step 30a is supplied from a resin manufacturer who manufactures the resin with an epoxy resin 24, silica 25 as a filler and so forth.

A transformer manufacturer makes the molded coils 2 and 20 in the step 30a with the winding wire supplied from a winding wire manufacturer, resin 21 supplied from a resin manufacturer and insulating material 23 supplied from an electrical material manufacturer. The molded transformer 19 is made in the step 30b with the molded coils 2 and 22, core 1, clasp 12 and so forth.

A transformer user uses the molded transformer 19 supplied from a transformer manufacturer for about 20 to 30 years, and discards it after judging that its service time ends when it can no longer work sufficiently safely as a result of deteriorated insulating material or the like.

For recycling the used transformer 19a, it is necessary to dismantle it by a dismantler (step 50). Of the transformer parts, the core 1 and clasp 12 become iron scraps, and the primary and secondary terminals 10 and 11 are sellable for recovering copper. However, the molded coils 2 and 20 are difficult to dismantle, because they are assemblies with the epoxy resin 24, silica 25, aluminum, copper and so forth. They have been mainly disposed of by burying them either (1) directly or (2) after being crushed to selectively recover the metals. The recycling rate of the molded transformer as a whole is low in the procedure (1) because the electroconductive material 27, epoxy resin 24 and silica 25 are directly discarded, and even in the procedure (2) because the epoxy resin 24 and silica 25 are directly discarded. Moreover, the metals recovered by the procedure (2) are contaminated with the hardened resin 21, insulating material 23 and so forth, which deteriorates their values. Both procedures are not desirable viewed from environmental protection. In order to easily separate the epoxy resin 24, silica 25, electroconductive material 27, glass fibers 26 and so forth from the molded coils 2 and 20, it is necessary to dissolve the epoxy resin 24.

Figure 4:
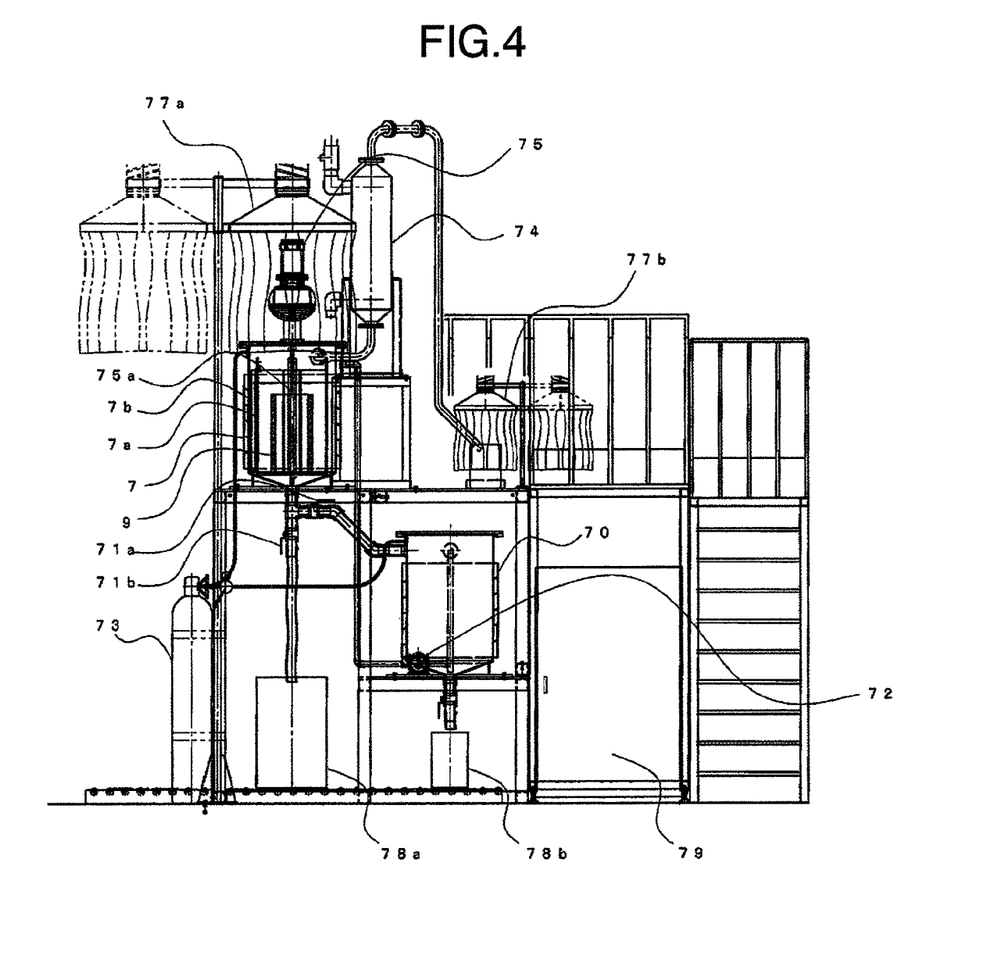
FIG. 4 illustrates a molded coil dissolution equipment.

The present invention is described by referring to FIG. 3B which illustrates a recycling flow scheme, and FIG. 4 which illustrates a dissolution equipment.

The molded coils 2 and 20 to be treated, solvent 90 and catalyst 91 are dried/dehydrated by separate steps before they are put in the dissolution processing tank 7 for the dissolution treatment (step 8).

The metallic salts useful as the catalysts for the present invention include, but not limited to, hydride such as ammonium, hydrides, borohydrides, amides, fluorides, chlorides, bromides, iodides, borates, phosphates, carbonates, sulfates, nitrates, organic acid salts, alcolates, phenolates, lithium, sodium, potassium, rubidium, cesium, beryllium, magnesium, calcium, strontium, barium, titanium, zirconium, vanadium, chromium, manganese, iron, cobalt, nickel, copper, silver, palladium, zinc, aluminum, gallium, tin and their hydrates. They may be used either individually or several species may be used in combination. They will work when contaminated with one or more impurities. Alkaline metal salts are more preferable.

The solvents useful for the present invention include, but not limited to, amides, e.g., formamide, N-methylformamide, N,N-dimethylformamide, N,N-diethylformamide, acetoamide, N-methylacetoamide, N,N-dimethylacetoamide, N,N,N',N'-tetramethylurea, 2-pyrrolidone, N-methyl-2-pyrrolidone, caprolactam and carbamide acid ester; alcohols, e.g., methanol, ethanol, 1-propanol, 2-propanol, 1-butanol, 2-butanol, iso-butanol, tert-butanol, 1-pentanol, 2-pentanol, 3-pentanol, 2-methyl-1-butanol, iso-pentyl alcohol, tert-pentyl alcohol, 3-methyl-2-butanol, neopentyl alcohol, 1-hexanol, 2-methyl-1-pentanol, 4-methyl-2-pentanol, 2-ethyl-1-butanol, 1-heptanol, 2-heptanol, 3-heptanol, cyclohexanol, 1-methylcyclohexanol, 2-methylcyclohexanol, 3-methylcyclohexanol, 4-methylcyclohexanol, ethyleneglycol, ethyleneglycol monomethyl ether, ethyleneglycol monoethyl ether, ethyleneglycol monopropyl ether, ethyleneglycol monobutyl ether, diethyleneglycol, diethyleneglycol monomethyl ether, diethyleneglycol monoethyl ether, diethyleneglycol monopropyl ether, diethyleneglycol monobutyl ether, triethyleneglycol, triethyleneglycol monomethyl ether, triethyleneglycol monoethyl ether, tetraethyleneglycol, polyethyleneglycol (molecular weight: 200 to 400), 1,2-propanediol, 1,3-propanediol, 1,2-butanediol, 1,3-butanediol, 1,4-butanediol, 2,3-butanediol, 1,5-pentanediol, benzyl alcohol, glycerin and dipropyleneglycol; ketones, e.g., acetone, methylethylketone, 2-pentanone, 3-pentanone, 2-hexanone, methylisobutylketone, 2-heptanone, 4-heptanone, diisobutylketone, cyclohexanone, methylcyclohexanone, phorone and isophorone; ethers, e.g., dipropyl ether, diisopropyl ether, dibutyl ether, dihexyl ether, anisole, phenetole, dioxane, tetrahydrofuran, acetal, ethyleneglycol dimethyl ether, ethyleneglycol diethyl ether, diethyleneglycol dimethyl ether and diethyleneglycol diethyl ether; and esters, e.g., ethyl acetate and butyl acetate. They may be incorporated with water or an inorganic solvent, e.g., liquid ammonia. They may be used either individually or several species may be used in combination. They will work when contaminated with one or more impurities. Of these, amides or alcohols are more preferable.

The molded coils 2 and 20 are dried in a furnace or constant-temperature tank. Furnace temperature is not limited so long as it exceeds 100° C. because the object of the treatment is to remove moisture from these coils. In this example, they are dried in a furnace at 105° C. for 1 hour.

The catalyst 91, 91a, which is solid or powdery, is dried in a furnace or constant-temperature tank as is the case with the molded coils. They are stored in a desiccator containing a desiccating agent before the molded coils are dissolved in the step 8.

The solvent 90, 90a, which is liquid, is dehydrated with a desiccating agent put therein while being left for a given time in the step 82a. The dehydration-treated solvent is measured for its moisture content (step 82b) to confirm that the content is at a given management level or less.

On completion of the drying/dehydrations steps 80a, 81a and 82a, the molded coils 2 and 20 are put in a dissolution basket 7a (step 80b) and then put in a dissolution processing tank 7 while being held by the basket (step 8a). The solvent 90, 90a is also put in the dissolution processing tank swiftly to suppress absorption of moisture in air together with the desiccating agent used for dehydration of the solvent. The catalyst 91, 91a is also swiftly put in a catalyst basket 7b, which is set in the dissolution processing tank 7. The desiccating agent 93a is also swiftly put in a desiccating agent basket 7c (step 83b). Finally, the dissolution processing tank 7 is closed swiftly by a lid.

Then, the dissolution processing tank 7 is heated to heat the solvent to and stabilize at a treatment temperature while a nitrogen gas 94 is injected from a nitrogen cylinder at a rate of 0.2 L/minute, to dissolve the epoxy resin 24 in the object to be treated. The dissolution processing tank 7 is open to air via a condenser to avoid build-up of internal pressure. However, benzyl alcohol 90 flowing out of the tank in the form of vapor is condensed by the condenser and returned back to the dissolution processing tank 7. Dissolving temperature varies depending on size of the object to be treated, types and quantities of the solvent and catalyst, dissolving treatment temperature, and so forth.

On completion of the dissolving treatment, a ball valve 71a is opened to transfer the treating solution to a management tank 70, and then to a receiver container 78b after it is cooled to 50° C. or lower. This temperature level, however, is not strict, and may be set at an adequate level in consideration of safety to human bodies, and preventing the solvents 90 and 90a in the treating solution from being discharged in the form of vapor after the dissolving treatment step 8 is over. The treating solution may be lifted by a slurry pump 72 from the management tank 70 into the dissolution processing tank 7 for the dissolving treatment 8 of the additional object to be treated, when it still has a capacity for dissolving the additional resin.

On completion of the dissolving treatment, a ball valve 71b may be opened to directly transfer the treating solution to the receiver container 78b. However, this may cause problems of retarded dissolving treatment, because of necessity for holding it in the dissolution processing tank 7 until it is cooled to 50° C. or lower.

The components left undissolved in the dissolving treatment step is withdrawn from the dissolution basket 7a (step 80c), which has been put in the dissolution processing tank, and then washed (step 80d), to recover the electroconductive material 27a, glass fibers 26 and so forth.

The catalyst 91, 91a is withdrawn from the catalyst basket 7a (step 81c) and then washed and dried (step 81d), the recycled catalyst 91a being reused for the subsequent dissolving cycle.

The dissolved epoxy resin 24a and the solvent 90, 90a in which the silica 25 is dissolved are transferred to the receiver container 78b or 78a, and then filtered (step 82d) to separate them into a filtration cake 25z, filtrate 90z and molten epoxy resin 24a. The filtration cake 25z is washed (step 84a), and the recovered silica 25a is reused. The filtrate 90z is distilled (step 82e) to recover the recycled solvent 90a. The dissolved resin 24a is reused as a fuel.

The desiccating agent 93, put in the dissolution processing tank 7 together with the solvent 90', 90a', is withdrawn from the desiccating agent basket 7c (step 83c) on completion of the dissolving treatment, washed with a solvent and water, and dried (step 83d), the recycled desiccating agent 93a being reused in the subsequent dissolving cycle for solvent dehydration, storing the dried catalyst 91, 91a, and dehydration in the dissolving treatment step 8.

The solvent for washing is also recovered by a distillation unit, and reused for the subsequent dissolving cycle.

The above steps selectively dissolve the epoxy resin 24 in the molded coils 2 and 20, allowing the electroconductive material 27 and silica 25a to be easily separated and recovered.

Example 2

Example 1 is described for the dissolving treatment carried out under the normal pressure. The treatment under the normal pressure improves safety, reduces facility cost, and is suitable for recycling molded coils.

Example 3

Example 1 is described with tribasic potassium phosphate as the catalyst. Tribasic potassium phosphate is a designated food additive, and is safe and relatively inexpensive. However, moisture management of this compound is important, because it turns strongly alkaline when dissolved in water. In this example, tribasic potassium phosphate n-hydrate 91 is dried in a furnace or constant-temperature tank kept at 300° C., and then stored in a desiccator which contains a desiccating agent before the molded coils are dissolved. The desiccating agent can be selected from various ones, and this example uses a molecular sieves 93 which adsorbs water molecules by its porous pores.

Example 4

Example 1 is described with benzyl alcohol as the solvent. Benzyl alcohol 90, 90a is a designated food additive, and is relatively safe and readily available. However, it is dangerous in that it may form an explosive mixture with air to cause explosion, when dried under heating in a furnace or constant-temperature tank, which is used for dehydration of the objects 2 and 20 to be treated and catalysts 91 and 91a. Therefore, it is necessary to dehydrate it without using heat, e.g., by being left together with a desiccating agent or bubbled with nitrogen.

Increasing solvent temperature in the dissolving treatment 8 reduces dissolving treatment time. The dissolution processing tank 7 is open to air via a condenser to avoid build-up of internal pressure. However, benzyl alcohol 90 or 90a flowing out of the tank in the form of vapor is condensed by the condenser and returned back to the dissolution processing tank 7. The solvent management temperature could be increased to about 205° C., in consideration that boiling point of benzyl alcohol is about 205° C. At such a temperature level, however, benzyl alcohol is kept boiling, and the condition is difficult to distinguish from that resulting from abnormal temperature rise. Therefore, the solvent management temperature is set at 190° C. in the dissolution treatment 8 in this example.

On completion of the dissolution treatment 8, the ball valve 71a is opened to transfer the treating solution to a management tank 70, and then to a receiver container 78b after it is cooled to 50° C. or lower, because benzyl alcohol is hazardous when present at a high concentration.

Example 5

In Example 1, the electroconductive material 27 for the winding wire 22 for the molded coils 2 and 20 as the objects to be treated are mainly of aluminum or copper. Example 5 is described by taking the molded coil of aluminum conductor, which is more widely used. In such a case, aluminum may cause problems when the dissolving system is contaminated with moisture, because the moisture reacts with aluminum to produce an aluminate compound, which is transformed into aluminum oxide (alumina) under heating, which, in turn, may cause abnormal temperature rise to dissolve aluminum. This may be accompanied by formation of hydrogen, which can cause danger of explosion. It is crucial, therefore, to manage moisture in an overall process involving the object to be treated, catalyst, solvent and dissolving system.

The dissolution processing tank 7 is provided with an exhausting hood 77a in the upper portion. It is also provided with an exhausting hood 77b at the point at which it is open to air via a condenser. It should be designed to prevent hydrogen from contacting oxygen, should it be formed by the reaction of contaminant moisture in the dissolving system with aluminum. For a double safety measure, heating of the dissolution processing tank is automatically terminated by a control panel 79, should abnormal temperature rise caused by moisture in the dissolving system occur, and the treating solution is transferred from the dissolution processing tank 7 to the management tank.

Example 6

Example 1 is described for moisture content in the solvent dehydration-treated in the step 82*a*. The solvent 90 dehydration-treated in the step 82*a* may contact air while being transferred to the dissolution processing tank 7 to have a higher moisture content in the dissolution processing tank 7 than the as-dehydrated one. It is empirically confirmed that moisture will not cause temperature run-away resulting from the reaction with aluminum when it is present at 0.5% or less in the dissolution processing tank 7 in the dissolving treatment 8. The moisture management level is set at 0.1% or less in the dehydration treatment of the solvent 90 assuming that it may contact with air while being transferred to the dissolution processing tank 7 to have a fivefold increased moisture level, in which some safety factor is included. It is however preferable to limit transfer time of the solvent 90 dehydration-treated in the step 82 to the dissolution processing tank 7 at 5 minutes or less, because the moisture level in the solvent 90 will increase as the transfer time increases.

Example 7

Example 1 is described for the desiccating agent used for dehydration of the solvent. The solvent held in a container is dried while being left with the molecular sieve 93 incorporated therein. Benzyl alcohol, when used as the solvent, will have a moisture content of 0.1% or less with 200 g of the molecular sieves per 1000 g of benzyl alcohol, when left for 48 hours.

Example 8

Example 1 is described for the desiccating agent used for dehydration in the dissolving treatment 8. When a molecular sieves is used as the desiccating agent for dehydration of the solvent 90 in the dehydration treatment (step 82*a*), the solvent 90 is also incorporated with the molecular sieves 93 when put in the dissolution processing tank 7 (step 8*a*) to reduce required working steps. Use of a molecular sieve as the desiccating agent for dehydration in the dissolving treatment 8 improves working efficiency, because the molecular sieves 90', 90*a*' used in the dissolving treatment 8 for solvent dehydration can be washed and dried (step 83*d*) together with that used for dehydration of the solvent.

Example 9

Figure 5:
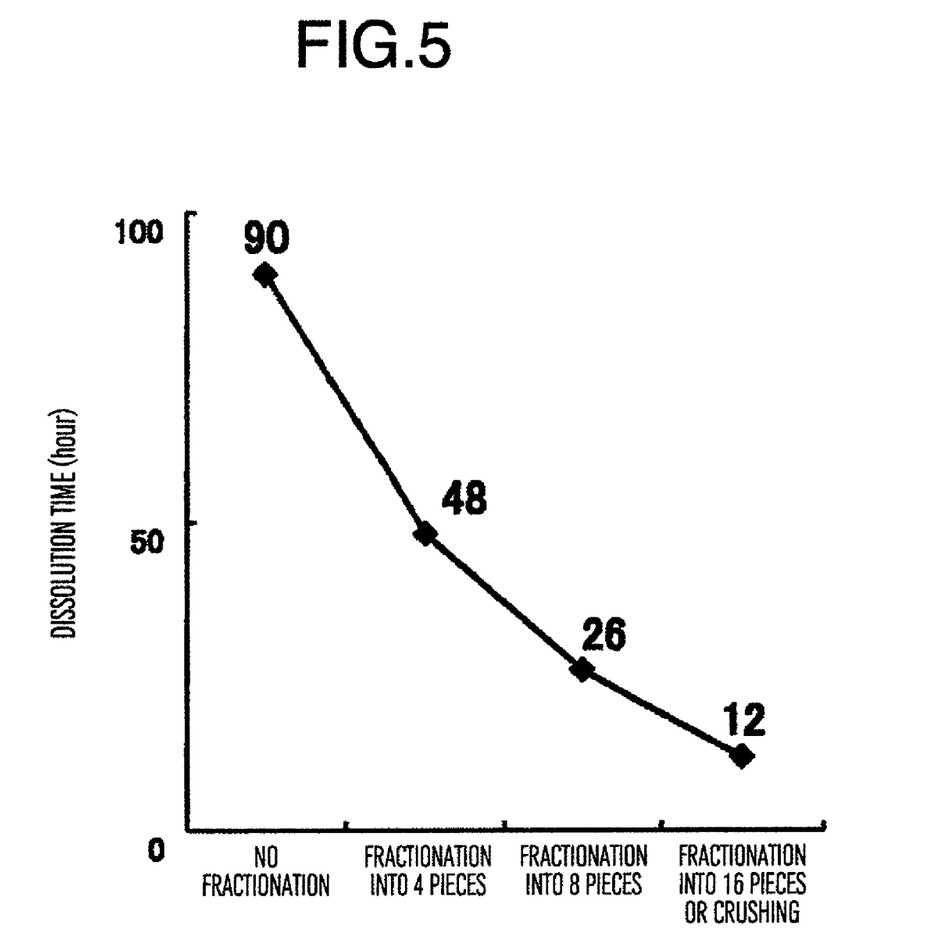
FIG. 5 illustrates a relation between number of fractionated coil pieces and dissolution time.

Example 1 is described with the object to be treated being fractionated into pieces. FIG. 5 illustrates a relation between number of fractionated coil pieces and melting time. It is confirmed that the melting/washing cycle can be achieved within 24 hours when the object is fractionated into 16 pieces, because the dissolving time is decreased to 12 hours.

Example 10

Example 1 is described with the object to be treated being crushed. As illustrated in FIG. 5, it is confirmed that the melting/washing cycle can be achieved within 24 hours when the object is crushed, as is the case with the object fractionated into 16 pieces.

Example 11

Example 1 is described with the dissolution processing tank 7 equipped with a stirrer. The treating solution is stirred by an agitating blade 75*a* driven by a motor 75 for the stirrer to reduce the dissolving time.

It should be further understood by those skilled in the art that although the foregoing description has been made on embodiments of the invention, the invention is not limited thereto and various changes and modifications may be made without departing from the spirit of the invention and the scope of the appended claims.

ADVANTAGES OF THE INVENTION

The present invention for recycling an electrical equipment including a hardened epoxy resin and electroconductive material is economically advantageous, because the catalyst deactivates little in the dissolving step and can be reutilized in the subsequent recycling cycles.

It can safely dissolve a hardened epoxy resin in recycling of an electrical equipment including a hardened epoxy resin and aluminum conductor, and recover fillers in the aluminum conductor and epoxy resin.

Moreover, the system of the present invention for recycling an electrical equipment, provided with a dissolution processing tank in which an object to be treated, catalyst, solvent and desiccating agent are treated, stirs the treating solution in the dissolving treatment to reduce the recycling time.

What is claimed is:

1. A system for recycling a molded coil component of a molded transformer, comprising;
    a dissolution processing tank to receive therein the molded coil component of the molded transformer as an object to be treated, the molded coil including a hardened epoxy resin containing filler mixed therein and electroconductive material, the molded coil having a water content of 0.5% or less;
    a catalyst comprising at least one species of a metallic salt having a water content of 0.5% or less and disposed in the dissolution processing tank;
    a solvent having a water content of 0.5% or less and disposed in the dissolution processing tank;
    a desiccating agent disposed in the dissolution processing tank; and
    a management tank in fluid communication with the dissolution processing tank,
    wherein during a dissolving treatment, a dissolving treating solution comprising the catalyst and the solvent is stirred and heated to a treatment temperature, and nitrogen gas is injected into the dissolution processing tank at a rate of 0.2 L per minute to dissolve the epoxy resin of the molded coil,
    wherein the dissolving treating solution and the filler mixed therein is transferred from the dissolution processing tank to the management tank subsequent to the dissolving treatment and cooled to a temperature of $\leqq 50°$ C.

* * * * *